United States Patent [19]

Saito et al.

[11] 4,212,096

[45] Jul. 15, 1980

[54] AUTOMATIC RESILIENT RING FITTING DEVICE

[75] Inventors: Tatsuoki Saito; Eiji Nagashima, both of Kofu, Japan

[73] Assignee: Tokico Ltd., Kanagawa, Japan

[21] Appl. No.: 935,315

[22] Filed: Aug. 21, 1978

[30] Foreign Application Priority Data

Aug. 20, 1977 [JP] Japan ................................. 52/100031

[51] Int. Cl.² .............................................. B23P 19/02
[52] U.S. Cl. ..................................................... 29/235
[58] Field of Search .......................... 29/235, 451, 280

[56] References Cited

U.S. PATENT DOCUMENTS

| | | | |
|---|---|---|---|
| 2,619,964 | 12/1952 | Theate | 29/235 |
| 3,030,700 | 4/1962 | Jensen | 29/235 |
| 3,347,083 | 10/1967 | Tarpin et al. | 29/235 |
| 3,604,096 | 9/1971 | Shiroma | 29/235 |

FOREIGN PATENT DOCUMENTS 815829 4/1937 France ........................................ 29/235

*Primary Examiner*—James L. Jones, Jr.
*Attorney, Agent, or Firm*—Wenderoth, Lind & Ponack

[57] ABSTRACT

An automatic fitting device for fitting an elastic annular ring such as an O-ring or the like on the outer circumferential groove of an article such as a piston or the like. The device includes a support for supporting the article thereon, a guide having a conically shaped surface with the large diameter end of which is adapted for abutting at one end surface of the article supported on the support, a piece for moving the elastic annular ring fitted on the conical surface along the conical surface with the diameter of the ring being enlarged and thus pushing the ring onto the article and fitting the ring into the circumferential groove of the article, and a structure for supporting the guide when the guide is not abutting at the article.

7 Claims, 12 Drawing Figures

AUTOMATIC RESILIENT RING FITTING DEVICE

BACKGROUND OF THE INVENTION

This invention relates to an automatic fitting device for automatically fitting an elastic annular ring on a circumferential groove which is formed on an article such as piston or the like.

Conventionally, an elastic annular ring such as seal ring or the like has been fitted on a circumferential groove of an article such as piston or the like by enlarging or elastically deforming the ring with the fingers of a worker, fitting the ring on the article, and inserting the same into the groove, thus, the fitting operation is difficult and troublesome. A conically shaped fitting jig is proposed, wherein the elastic ring can be relatively easily fitted on the groove of the article by using the jig. It is desirable to automatically perform the fitting operation, but if the fitting jig is secured or connected to the main body of fitting device, the connecting portion will hinder a continuous supply of elastic rings to the fitting jig. Therefore, in the prior art, the conically shaped fitting jig has been supported by the worker.

SUMMARY OF THE INVENTION

An object of the present invention is to provide an automatic fitting device for automatically fitting an elastic annular ring on a circumferential groove of an article. The device comprises a support for supporting the article thereon, a frusto-conically shaped guide with the large diameter end thereof being adapted to abut at the upper end of the article which is supported on the support, a means for moving the ring along the conical surface of the guide with the diameter of the ring being enlarged, pushing the ring onto the article and fitting the same into the circumferential groove of the article, and a means for supporting the guide when the guide is not abutting at the article. Thus, it is possible to omit the troublesome and time consuming conventional manual fitting operation thereby increasing the reliability of the fitting operation, and improving working efficiencies.

BRIEF DESCRIPTION OF THE DRAWINGS

The invention will hereinafter be explained in detail with reference to the accompanying drawings, in which.

DETAILED DESCRIPTION OF THE PREFERRED EMBODIMENTS

Figure 1:
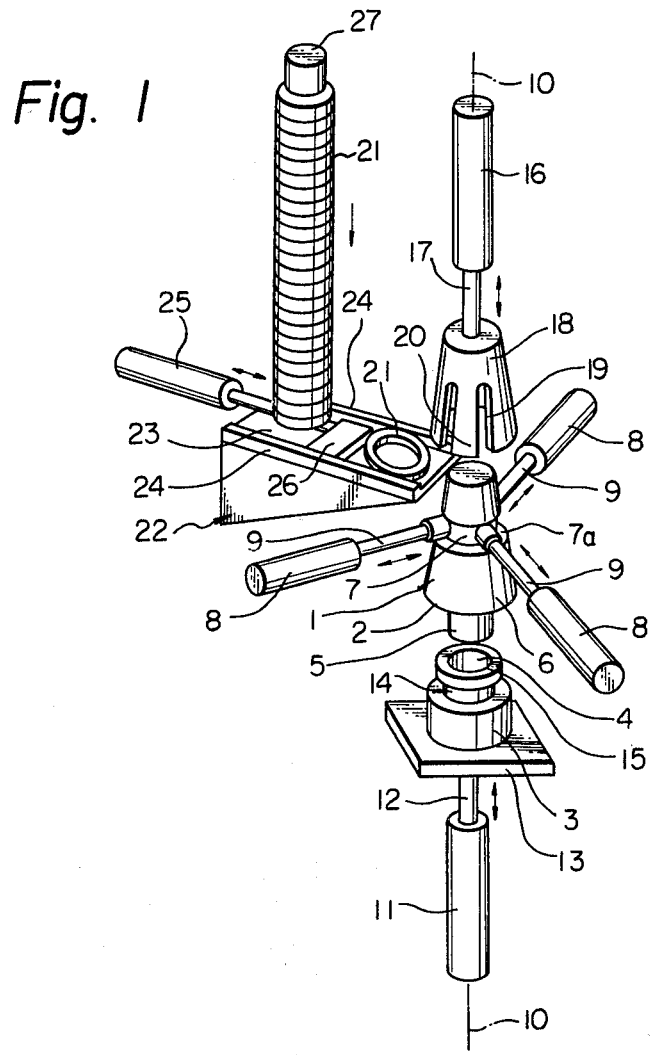
FIG. 1 is a perspective view showing one embodiment of the present invention.

The embodiment shown in FIG. 1 includes a generally frusto-conically shaped guide 1 having the lower surface 2 thereof being shaped having a cylindrical projection 5 thereon for being received in a recess 4 which is located in an article 3 (explained in detail hereinafter), and an annular groove 7 is located on the upper portion of a conically shaped outer surface 6 thereof. There are disposed three hydraulic or pneumatic cylinders 8 in a horizontal plane which is defined by the annular groove 7 and piston rods 9. The piston rods 9 extend radially with respect to the guide 1 for engaging the groove 7 at circumferentially spaced positions. Preferably, the cylinders 8 are equally spaced with respect to one another about the circumference of the guide 1. Thus, the guide 1 is supported in the position as shown in the drawing by the cylinders 8. The article 3 such as a piston or the like is releasably secured on a supporting plate 13 which is secured to the upper end of a piston rod 12 of a hydraulic or pneumatic cylinder 11. The guide 1, the article 3, the supporting plate 12 and the cylinder 11, and a cylinder 16 and associated parts (described hereinafter) are coaxially disposed about a common vertical axis 10. The article 3 has a generally cylindrical shape with the recess or opening 4 located in the upper end, and a circumferential groove 14 for receiving the elastic ring 21 immediately below the upper end. The upper end surface 15 of the article 3 abuts at the lower surface 2 of the guide 1 when the piston rod 12 of the cylinder 11 is extended. There is disposed on the upper side of the guide 1 the cylinder 16 which is actuated hydraulically or pneumatically with a piston rod 17 which extends vertically downward therefrom, and an inserting member 18 which is secured to the piston rod 17 and depends therefrom. As shown in the drawing, the inserting member 18 is a generally frusto-conically shaped hollow member with the larger end being disposed downward and the smaller end upward. A plurality of longitudinal slots 19 are formed in the inserting member 18 and extend from the lower end thereof toward and near the upper end of the member 18. Three of the slots 19 have a dimension for respectively freely receiving the piston rods 9 of the cylinders 8 therein with the piston rods 9 located for registering therewith. The lower end portions 20 of the inserting member 18 are resiliently bent radially inward, so that when the inserting member 18 is placed over the guide 1, there is left a small or no clearance between the conical surface 6 and the portions 20.

When the piston rod 17 of the cylinder 16 is in its retracted position as shown in FIG. 1, there is a clearance between the upper end of the guide 1 and the lower end of the inserting member 18, and the clearance is used to mount the resilient annular ring 21 such as a seal ring or the like onto the guide 1. In this embodiment there is disposed a stationary support 22 opposite one of the cylinders 8 and radially outside of the guide 1 and the inserting member 18. The support 22 has parallel guide plates 24 on opposite sides of its generally horizontal upper surface 23. A push-out plate 26 is slidably disposed on the surface 23 and along the guide plates 24, and is connected to a hydraulic or pneumatic cylinder 25 through a piston rod thereof. A vertical guide column 27 is releasably mounted on a suitable frame member (not shown) above the upper surface 23 of the support 22 at the outer portion thereof as viewed in FIG. 1 with the lower end of the column 27 being spaced from the upper surface 23. A plurality of resilient rings 21 are overlappingly received on the column 27. The rings 21 received on the column drop one by one onto surface 23 between the guide plates 24 each time the push-out plate 26 is moved leftward as shown in the drawing, into the retracted position.

The automatic fitting device of FIG. 1 operates as follows. First, the guide 1 is retained at a predetermined position (as shown in FIG. 1) by the piston rods 9 of cylinders 8. An article 3 is located on the supporting plate 13 with the associated cylinder 11 being in the retracted position so that a space is formed between the lower end of the guide 1 and the upper surface of the plate 13 which is sufficient to handle the article 3. The cylinder 25 is actuated so that one of the resilient rings 21 which has been mounted on the column 27 drops onto the surface 23 and is pushed toward the guide 1 by the push-out plate 26. The seal ring 21 passes through the space between the upper end of the guide 1 and the lower end of the inserting member 18 and fits around the upper end portion of the guide 1. At this time, the cylinder 16 of the inserting member 18 is in its most retracted position. (FIG. 2a) Then, the cylinder 10 is actuated thereby moving the article 3 upward so that the projection 5 fits in the recess 4 and the upper surface 15 of the article 3 abuts at the lower surface 2 of the guide 1 as shown in FIG. 2b.

Figures 2A, 2B, 2C, 2D, 2E:
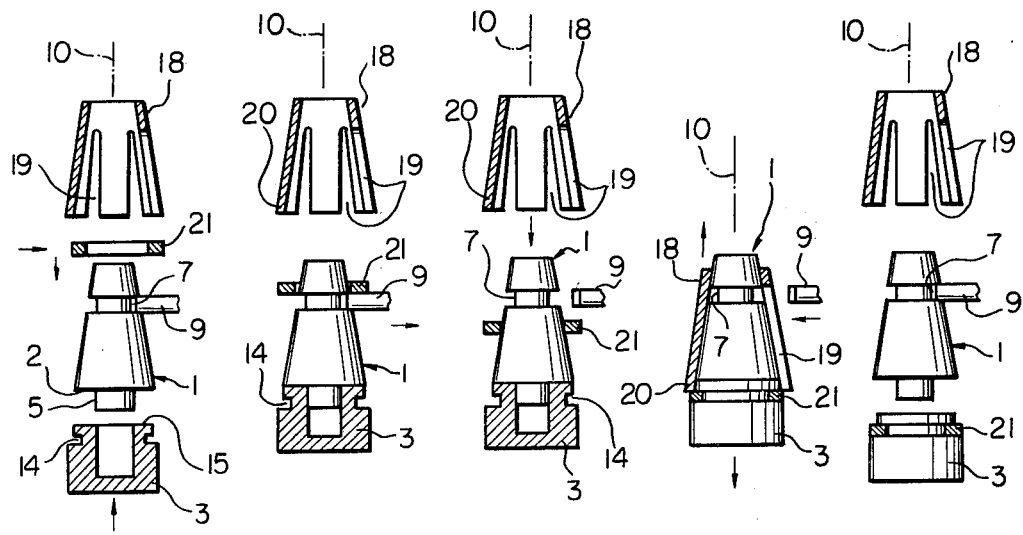
FIGS. 2a-2e are views showing the sequential operation of the device of FIG. 1.

The cylinders 8 are actuated for retracting the piston rods 9 from the annular groove 7 as shown in FIG. 2c. The resilient ring 21 fitted on the upper portion of the guide 1 preferably due to its own weight passes across the groove 7 and engages the conical surface 6 at the lower side of the groove 7. Thereafter, as shown in FIG. 2c, the inserting member 18 is moved downward by actuating the cylinder 16 so that the lower end portions 20 of the member 18 move the ring 21 downward along the conical surface 6 with the diameter of the ring 21 being enlarged. At the end of the downward stroke of the cylinder 16 the ring 21 is fitted into the circumferential groove 14 of the article 3 as shown in FIG. 2d. For effecting the sliding movement of the ring 21 along the surface 6 smoothly, grease or the like is preferably applied to the resilient ring 21 beforehand.

The cylinders 8 are actuated and the piston rods 9 thereof pass through corresponding slots 19 of the inserting member 18 and engage the groove 7 of the guide 1, additionally the inserting member 18 is moved upward by retracting the cylinder 16 as shown in FIG. 2d. The supporting plate 13 is lowered by actuating the cylinder 11. The article 3 is removed from the supporting plate 13 and a new article 3 is mounted on the plate. Thus, one operational cycle is completed, and a new cycle can be similarly performed.

When there is not formed the recess 4 in the article 3, the projection 5 of the guide 1 may be omitted, but this results in a problem in that the guide 1 and the article 3 may then move in the radial direction in when fitting the resilient ring 21 on the article 3. It is preferable to form on the lower end of the guide 1, a skirt portion which defines a cylindrical or downwardly tapering outer surface and a cylindrical inner surface for covering at least a portion of the upper end portion of the article 3 thereby insuring alignment of the guide 1 with respect to the article 3 for effecting a smooth transfer of the resilient ring 21 from the conical surface 6 of the guide to the outer surface of the article 3. The skirt portion may be omitted when the alignment between the guide 1 and the article 3's accurate.

Figure 3:
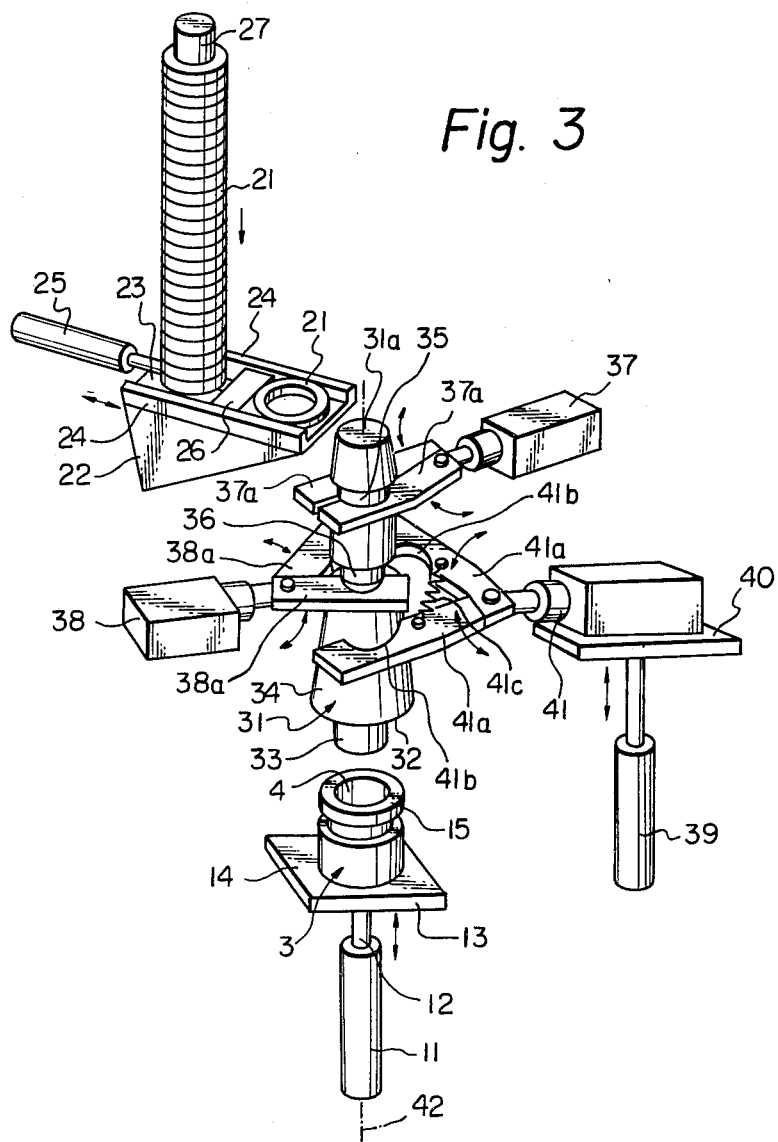
FIG. 3 is a perspective view showing another embodiment of the present invention.

FIGS. 3 and 4 show another embodiment of the invention, and parts corresponding to the first embodiment are designated by correspondingly the same numerals.

A frusto-conically shaped guide 31 has on its lower or large diameter side end surface 32 a cylindrical projection 33 which fits into the recess 4 of the article 3 and, on the upper portions of the generally conical outer surface 34 are located grooves 35 and 36 having a predetermined vertical or axial space therebetween. A chucking robot 37, having two opposing hands 37a is mounted on a stationary frame (not shown) in the same horizontal plane as the groove 35 for cooperating therewith, and a chucking robot 38 having two opposing hands 38a for cooperating with the groove 36 is mounted on a stationary frame (not shown) in the same horizontal plane as the groove 36. An inserting robot 41, having two opposing hands 41a, is mounted on a mounting plate 40 which is movable in the vertical direction by means of a vertically disposed hydraulic or pneumatic cylinder 39. The hands 41a, of the robot 41, have recesses 41b respectively for engaging with the conical outer surface 34 of the guide 31 and have a spring 41c extending therebetween, so that when lowering the inserting robot 41 by actuating the cylinder 39 with the hands 41a contacting the surface 34, the spring 41c acts to maintain the contact between the hands 41a and the surface 34.

On the lower side of the guide 31 there is disposed, around a common vertical axis 42, an article supporting mechanism having a construction generally similar to a first embodiment. The mechanism comprises the cylinder 11, piston rod 12 and supporting plate 13 for supporting the article 3. There is also disposed a resilient ring supplying mechanism having a construction generally similar to the first embodiment and comprising a stationary support 22, guide plates 24, supplying cylinder 25, push-out plate 26 and guide column 27. The ring supplying mechanism is adapted for supplying the rings 21 to the upper or small diameter end of the guide 31.

Figures 4A, 4B, 4C, 4D, 4E:
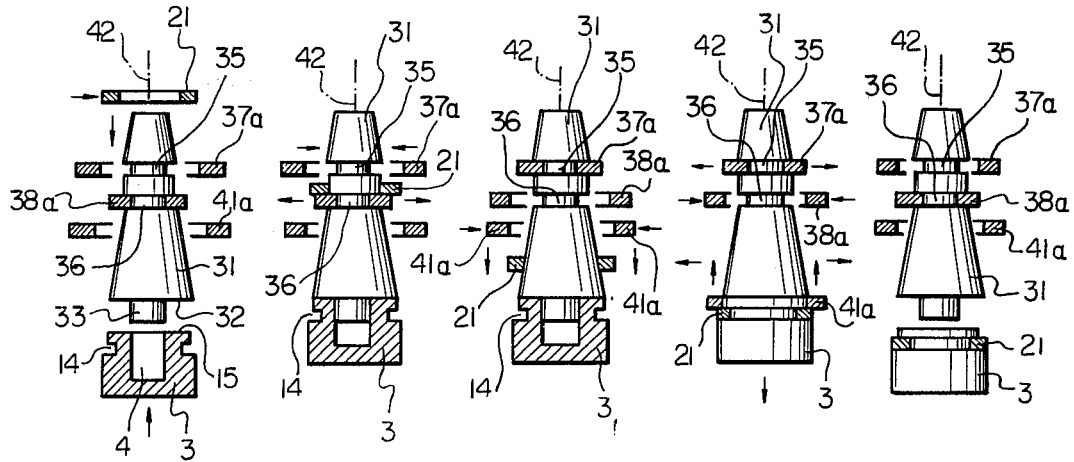
FIGS. 4a-4e are views showing the sequential operation of the device of FIG. 3.

The operation of the second embodiment will now be explained with reference to FIGS. 4a–4e. In FIG. 4a, chucking hands 38a of the chucking robot 38 engage the groove 36 of the guide 31 for retaining the guide 31 in its proper position. The chucking hands 37a of the chucking robot 37 and the hands 41a of the inserting robot 41 are in an open condition. The supplying cylinder 25 is actuated and one resilient ring 21 is pushed out of the support 22 and is loosely fitted onto the upper portion of the guide 31. The ring 21 drops onto the upper surfaces of the chucking hands 38a which are in a closed condition. The cylinder 11 of the article mounting mechanism is also actuated for engaging the upper surface 15 of the article 3 with the lower surface 32 of the guide 31, as shown in FIG. 4b. The chucking robot 37 is actuated for closing the hands 37a thereof for engaging with the groove 35 thereby retaining the guide 31 in its position and, thereafter, the robot 38 is actuated for opening the hands 38a thereof so as to drop the ring 21 which has been mounted on the upper surface of the hands 38a into the mid portion of the surface 34 as shown in FIG. 4c. It will be noted that the upper portion of the surface 34 of the guide 31 is not required to have a conical shape, and may have a cylindrical shape having a diameter smaller than the inner diameter of the ring 21 for allowing relatively free movement of the ring 21 which is fitted on the guide 31 by its own weight. The surface 34 of the guide 31 is formed so that the ring 21 will stop at a position lower than the groove 36 and lower than the lower surfaces of the hands 41a of the inserting robot 41 in the uppermost position (the most extended position of the cylinder 39).

The inserting robot 41 is actuated for closing the hands 41a thereof and the cylinder 39 is actuated thereby causing the hands 41a to descend and contact the conical surface 34 of the guide 31. The ring 21 is forcibly enlarged and moved downward and, finally, engages with the circumferential groove 14 in the article 3 as shown in FIG. 4d. Thereafter, the inserting robot 41 is actuated to open the hands 41a thereof, and the cylinder 39 is actuated to raise the robot 41. The chucking robot 38 is actuated and retains the guide 31 in its position with the hands 38a thereof engaging with the groove 36, and the chucking robot 37 is actuated for opening the hands 37a thereof. Simultaneously, the cylinder 11 of the article supporting mechanism is actuated and causes the supporting plate 13 and the article 3 supported thereon to descend from the guide 31. Thus, one operational cycle has been completed, as shown in FIG. 4e. A new article is mounted on the plate 13 and a new ring 21 is fitted thereon by a similar process.

As described heretofore, the automatic fitting device for fitting an elastic annular ring on a circumferential groove of an article, according to the present invention, comprises a support for supporting the article thereon, a guide having a conically shaped surface with the large diameter end of which being adapted to abut at one end surface of the article supported on the support, a means for moving the elastic annular ring fitted on the conical surface along said surface with the diameter of the ring being enlarged, pushing the ring onto the article and fitting the ring into the circumferential groove of the article, and a means for supporting and retaining the guide, at least when the guide is not abutting at the article. Thus, the resilient annular ring can automatically be fitted into the groove of the article, thereby eliminating troublesome manual fitting operations, enabling reliable fitting operations and improving on working efficiencies. Further, since the ring can be enlarged substantially along the entire circumference thereof and pushed into the circumferential groove of the article, the resilient ring can be prevented from rupturing or resulting in an imperfect fit. Further, the guide for guiding the ring onto the article is permanently retained in its position, thus, the fitting operation can reliably be performed even though the guide and the article do not fittingly engage (such that when the upper portion of the article is not formed to fittingly engage with the lower end of the guide or that when there is substantial vibrations in the fitting device).

The invention is by no means limited to the embodiments described and illustrated which have been given by way of example only. In particular, the invention includes all means which are technical equivalents to the means described as well as any combination thereof, should the latter be carried out according to the substance and within the scope of the appended claims. For example, the guide may be supported pivotally by guide retaining means, or the guide may be supported by suitable guide retaining means for moving from a ring supplying station wherein the ring is fitted on the upper portion of the guide to a fitting station remote from the supplying station.

What is claimed is:

1. An automatic fitting device for fitting an elastic annular ring on a circumferential groove on an article, said device comprising:
   a support for supporting said article thereon;
   a guide having a conically shaped surface with the large diameter end of said guide extending downward and shaped for abutting at one end surface of said article which is supported on said support, said guide adapted for having said annular ring mounted thereon;
   moving means for moving said elastic annular ring down along said conical surface and causing the diameter of said ring to enlarge, said moving means further pushing said ring onto said article and causing said ring to be fitted in said circumferential groove of said article; and
   clamping means for releasably clamping the outer surface of said guide and supporting said guide when said guide is not abutting at said article.

2. An automatic fitting device as claimed in claim 1 wherein said clamping means comprises at least three hydraulic cylinder devices which are disposed radially about said guide and having piston rods thereon, said guide having a circumferential groove near its small diameter end and said clamping means being shaped for engaging with said circumferential groove 3. An automatic fitting device as claimed in claim 2 wherein said moving means comprises:
   a hydraulic cylinder with the axis thereof extending vertically and being aligned with the axis of said guide and said article;
   said cylinder having a piston rod attached thereto;
   an inserting member connected to said piston rod and being located up from said small diameter end of said guide when said cylinder is not actuated, said inserting member having a shape for moving along said conical surface of said guide when said cylinder is actuated for moving said ring along said guide; and
   at least three vertically extending slots located in said inserting member for allowing said piston rods of said cylinder devices to move therein and engage with said circumferential groove of said guide for allowing relative movement of said inserting member with respect to said guide.

4. An automatic fitting device as claimed in claim 3 wherein said device further comprises a ring supporting means for supporting a plurality of said elastic rings and for supplying said rings one by one onto said small diameter end of said guide in a direction transverse to the axis of said guide.

5. An automatic fitting device as claimed in claim 1 wherein at least one recess is located in said conically shaped surface of said guide near the small diameter end for engaging with said clamping means.

6. An automatic fitting device as claimed in claim 5 wherein said recess is an annular groove.

7. An automatic fitting device as claimed in claim 5 wherein said clamping means comprises at least one pair of chucking hands having a hydraulic cylinder for actuation thereof.

* * * * *